United States Patent
McMartin et al.

[15] 3,651,400
[45] Mar. 21, 1972

[54] APPARATUS AND METHOD FOR TESTING THE INSERTION LOSS OF ELECTRICAL FILTERS

[72] Inventors: William J. McMartin, Cedar Rapids, Iowa; Hans E. Weidmann, Glendale, Wis.

[73] Assignee: Allen-Bradley Company, Milwaukee, Wis.

[22] Filed: May 26, 1969

[21] Appl. No.: 827,674

[52] U.S. Cl. .......................................... 324/57 R, 324/58 R
[51] Int. Cl. ...................................... G01r 27/00, G01r 27/04
[58] Field of Search ................... 324/57, 58, 57 A, 58 A, 78 J, 324/78 E

[56] References Cited

UNITED STATES PATENTS

| | | | |
|---|---|---|---|
| 3,025,462 | 3/1962 | King | 324/58 |
| 3,419,799 | 12/1968 | Papadeas | 324/57 |
| 2,746,015 | 5/1956 | Alsberg | 324/58 A |

OTHER PUBLICATIONS

Schlicke H. M. and Weidmann H. Compatible EMI Filters in IEEE Spectrum, Oct. 1967, pp. 59–68. TK1. 114.

Primary Examiner—Alfred E. Smith
Attorney—Arthur H. Seidel and Thomas O. Kloehn

[57] ABSTRACT

An apparatus for testing electrical filters is disclosed which includes an enclosed cavity made up of a plurality of sections joined to one another with plug-in connections. The cavity has a feed-in capacitor section at each end for introducing a low frequency current representative of a rated load current for a filter under test. The feed-in capacitor sections are each joined to one end of an inductor section, one of which inductor sections represents a power source impedance and the other inductor section representing a load impedance. The inductor sections are each connected at their opposite ends to a test section, one of which introduces high frequency signals representing electromagnetic interference into the cavity, and the other being used for measuring voltage across the load impedance. The cavity is completed by a filter section disposed between the two test sections which houses a filter under test. The complete circuit also includes a source of low frequency current to represent rated filter load, a high frequency generator attached to the test section that introduces high frequencies to the cavity, means for measuring high frequency current delivered to the circuit, and a detector connected to the other test section for reading measured voltage of the load impedance. Use of the apparatus involves a method of testing in which high frequency signals are introduced in parallel with the filter under test and the power source impedance, and measurements of the high frequency source current are made with the filter both in and removed from the circuit for a fixed load impedance voltage, from which current readings the filter insertion loss is calculated.

22 Claims, 2 Drawing Figures

INVENTORS
WILLIAM J. Mc MARTIN
HANS E. WEIDMANN

BY

ATTORNEY

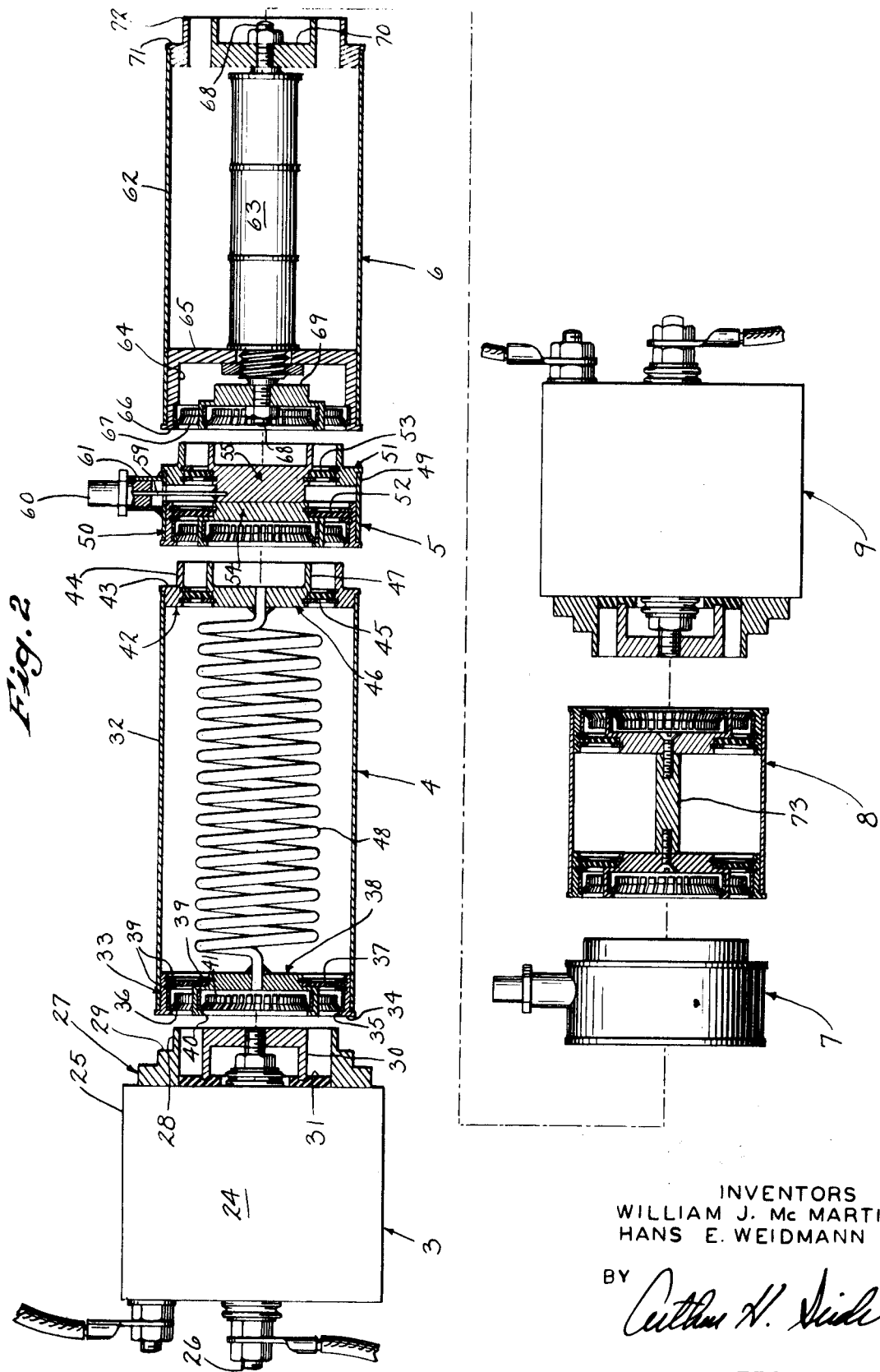

APPARATUS AND METHOD FOR TESTING THE INSERTION LOSS OF ELECTRICAL FILTERS

BACKGROUND OF THE INVENTION

There has been a need for satisfactory testing of electrical filters that are inserted between an electrical apparatus and a power source for the purpose of attenuating high frequency interference signals appearing on the power supply lines. Most test methods for determining the insertion loss of such power line filters have been deficient, for the reason they prescribe fixed source and load impedance values for connection to the filter, and such fixed values are not representative of actual operating conditions when the power source is a commercial power supply, or one that feeds several loads.

Typical test procedures deal with filters for use between preselected, fixed power supply impedances and fixed load impedances. A filter designed to provide an adequate insertion loss over the frequency range of electromagnetic interference between preselected, fixed power source and load impedances may not function adequately, and may even be detrimental, when used for eliminating electromagnetic interference appearing on commercial power supply lines. This is for the reason that impedance values presented by commercial power supplies vary with the switching of other loads off and on the line and with frequency. The interaction of these variable impedance values at the interface, or connection with a filter is determinative of the insertion loss provided by the filter. In some cases of impedance mismatch between a filter and the power source and load impedances to which it is connected the filter may lose all attenuating capability, and may even present a negative insertion loss.

It is necessary that a more satisfactory test be provided for filters used to eliminate electromagnetic interference from electrical apparatus connected to unregulated power lines presenting varying impedance values at the junctures with the filters. Such test should indicate throughout a frequency range what the insertion loss of the filter will be under conditions of worst mismatch between the filter and the power source and load impedances. The worst-case condition, for a given frequency, occurs when the reactive component of the power source, or the load is equal and opposite in value to that of the filter. A resonant condition then arises at the interface between filter and source, or load, and the effectiveness of the filter may sharply decrease. Since impedances of many power supplies are not predictable, and even vary, the filter performance under the worst-case condition for each frequency in the range of intended use should be determinable by test. Filter design can then be perfected to meet prescribed minimum insertion loss values over a preselected range of frequencies, and it is an object of the present invention to provide a satisfactory test apparatus for this purpose.

SUMMARY OF THE INVENTION

The present invention provides a circuit having an inductor, representing a power source impedance, and a high frequency current source in parallel with one another, these two elements of an impedance and current source being connectable to the input of a filter under test. The power source impedance is readily substituted by impedances of other values to enable tests to be made over a range of frequencies, and the circuit further contemplates use of a second impedance to simulate a load impedance and a low frequency current source to provide rated load currents for the filter, which current may have a biasing effect upon filter operation.

A preferred form of the invention houses the source and load impedances, the filter under test, capacitors for feeding in low frequency current, and test connections for introducing and measuring high frequencies in individual casings that are readily connectable with one another by plug-in technique. When assembled together, they provide an enclosed cavity in which the filter and source and load impedances are adequately shielded to thereby obtain accurate measurements. The individual casings provide for quick and ready substitution of different impedance values into the circuit and for ease of removal of a filter, so that the test procedure can be easily carried out. To further achieve the objective or reliable operation, test sections are provided in which direct metal to metal connections are made between test leads and the conductors joining the filter with the source and load impedances. Magnetically coupled probes for injecting high frequency and making measurements are consequently eliminated.

For obtaining worst-case conditions for a pi-type filter with capacitance in the shunt legs it is desirable to strive for pure inductors as representing source and load impedances. Resistance dampens resonance, and since a resonant condition at the interface between a filter and its power source and load connections represents the worst-case condition, the test apparatus should have a high Q for the inductors at frequencies in the vicinity of the worst-case condition. A Q of approximately 15 is satisfactory for this purpose, and it is an objective to provide a test circuit having a high Q interfacial connection between a filter and test circuit elements.

A further objective is to provide a high frequency current generator, that simulates electromagnetic interference, that approximates an ideal current source. Such a source has a high impedance that does not impair interfacial resonance between the filter under test and the high Q inductor simulating a power source impedance when connected directly to the filter and inductor. This simplifies the manner of introducing the high frequency and makes the circuit easier to construct and to use. Another test circuit of our design has been disclosed in IEEE SPECTRUM, Vol. 4, No. 10, Oct. 1967, pp. 59–68. There, injection and detection probes are magnetically coupled into the circuit by transformers, and the high frequency source is a voltage source serially connected with the simulated power source impedance. Such circuit is difficult to construct and use. Also, the present invention further departs by employing easily connected plug-in sections that provide an enclosed cavity when assembled. The frequency range over which an apparatus of the present invention is usable is also broader than for the prior circuit.

A further objective is to conduct a low frequency, or DC load current through the filter and test impedances to simulate actual operating conditions of the filter. Fifty amperes is presently typical of such load current flow, and the connections between the sections making up the test cavity must be sufficient to handle such values. Other objects are to provide a circuit that has a simple test procedure, that is rugged to withstand repeated handling of the circuit components, and which gives reliable results. The method of the test procedure is characterized by inserting fixed high Q inductors into the circuit, then varying the frequency of the electromagnetic interference signals until worst-case condition is met by observation of load impedance voltage, and then measuring the high frequency input current. Next, the filter is removed and measurement is made of the high frequency current for the same voltage across the load impedance. In this method, the high Q inductors are not complicated by being variable, and frequency variation is obtained indirectly by setting the current generator at a worst-case condition for each inductor value.

The foregoing and other objects and advantages of the invention will appear from the following description, in which description there is shown by way of illustration and not of limitation a preferred embodiment. Such embodiment does not represent the full scope of the invention, but rather the invention may be employed in many different embodiments, and reference is made to the claims for interpreting the scope of the invention.

BRIEF DESCRIPTION OF THE DRAWINGS

FIG. 2 is a view of individual sections that make up an enclosed cavity forming a part of the invention, in which some of such sections are shown in cross section and in which the sections are disconnected from one another to make more clear their individual constructions.

DESCRIPTION OF A PREFERRED EMBODIMENT

Figure 1:
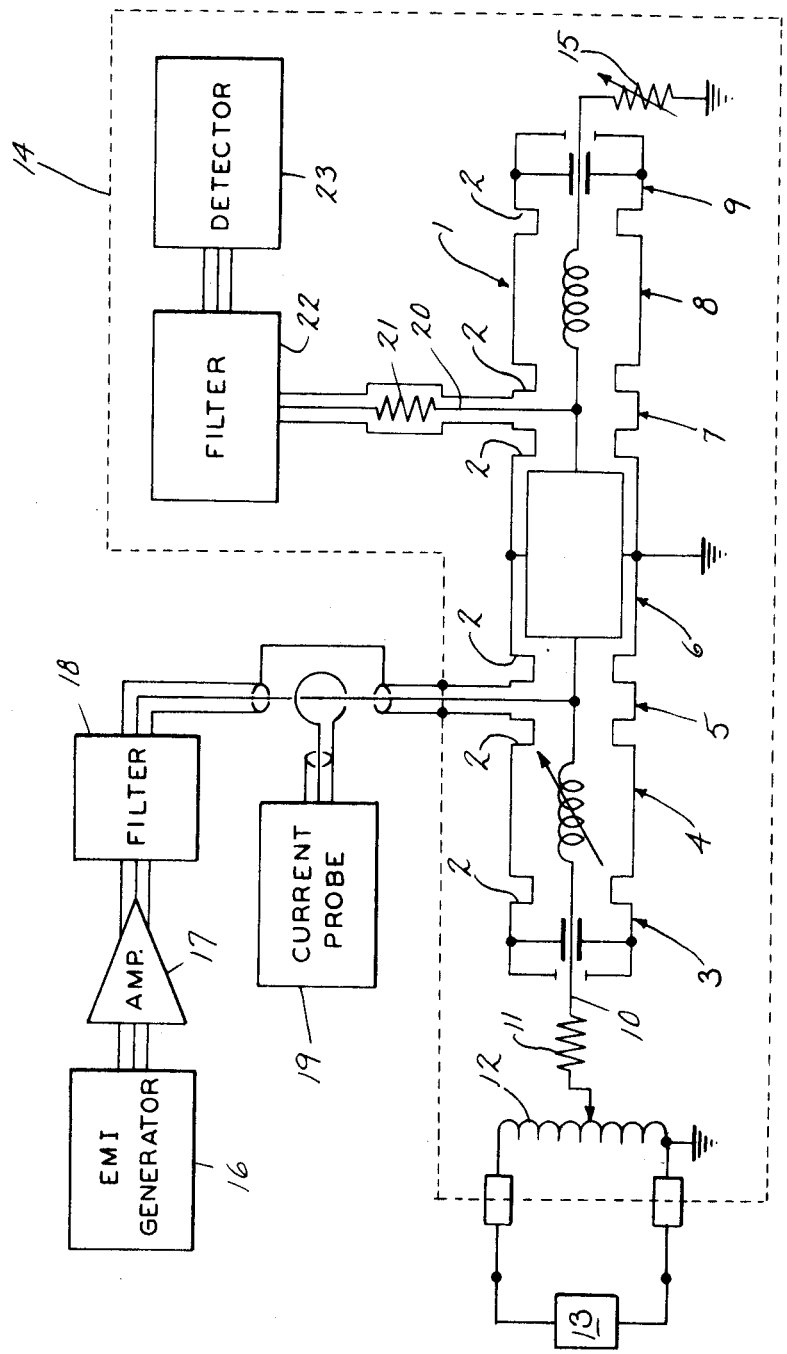
FIG. 1 of the drawings is a schematic wiring diagram of a circuit embodying the invention.

Referring to FIG. 1 of the drawings, a cavity 1 is represented by a solid line that encloses a number of circuit components, and this cavity 1 is shown as being sub-divided into a number of sections by clefts 2 in the solid line representation of the cavity. From left to right in FIG. 1, these sections comprise a capacitor section 3 for introducing a low frequency load current into the cavity 1, an inductor section 4 which simulates a power source impedance, a test section 5 for the introduction of high frequencies simulating electromagnetic interference, a filter section 6 that houses a filter under test, a second test section 7 for measuring voltage across a load impedance, a second inductor section 8 that simulates a load impedance, and a second capacitor section 9. The physical construction of these sections 3-9 will be described hereinafter in connection with FIG. 2.

Extending from the left-hand capacitor section 3 is a lead 10 that connects through a resistance 11 to a variable transformer 12. The transformer 12 is connected to a load current source 13 which provides a low frequency source to simulate the power delivered from a power source which is to be passed through a filter under test. The term low frequency source, as used herein also encompasses a direct current source, and it is distinguished from electromagnetic interference frequencies that are to be attenuated by a filter. The load current source 13 is isolated from the cavity 1 by locating the cavity 1 in a shielded room 14 that is represented by dotted lines. The load current fed to the cavity through the lead 10 passes from the right-hand capacitor section 9 through a variable load resistance 15. By adjustment of the load resistance 15 and the transformer 12 the low frequency current is set to a rated value for a filter under test. Fifty amperes is representative of such a value for present power line filters, and the various sections 3-9 must be capable of transmitting such current. The resistor 11 is provided to eliminate any possible resonance between the transformer 12 and the capacitance within the capacitor section 3.

To introduce a high frequency representative of electromagnetic interference into the cavity 1 a generator 16 is connected to the test section 5. The output of the generator 16 is fed to a power amplifier 17 and then through a high pass filter 18 to the test section 5. The purpose of the high pass filter 18 is to block low frequency current of the load current source 13 from entering the amplifier 17 and generator 16. Co-axial connections are provided between the elements 16, 17 and 18 and the test section 5, and for the purpose of making current measurements a standard current probe 19 is coupled with the coaxial line leading to the test section 5.

The second test section 7 has a lead 20 passing outward from the cavity 1 through a resistor 21 and a high pass filter 22 for connection with a detector 23. Such detector 23 measures the voltage within the cavity 1 that appears across an inductor within the second inductor section 8. The purpose of the resistor 21 is to preserve a high Q within the cavity 1, and the high pass filter 22 serves to block low frequency current from entering the detector 23.

Referring now to FIG. 2, and commencing with the left-hand capacitor section 3, there is shown a feed-in capacitor 24 that has a rectangular, block-shaped metallic exterior 25 which provides a shielded enclosure. A feed-through line 26 threaded at its opposite ends enters the shielded exterior 25 at the left-hand side and re-emerges at the right-hand side. The capacitor electrodes (not shown) of the capacitor 24 are electrically positioned between the feed-through line 26 and the shielding exterior 25, so that high frequencies representing electromagnetic interference which appear on the feed-through line 26 will be shunted to the exterior 25, and low frequencies introduced at one end of the feed-through line 26 will pass directly to the other end of the line 26.

On the right-hand face of the capacitor 24 there is bolted a male connector ring 27 that is concentric with and encircles the right-hand end of the feed-through line 26. This connector ring 27 presents a male rim 28 and a sealing face 29 adjacent the rim 28. Located inside the connector ring 27 is a cup shaped connection hub 30 tat constitutes an inner male connector member. This hub 30 is in threaded connection with the right-hand end of the feed-through line 26, and it is spaced from the shielding exterior 25 by an insulating ring 31.

Adjacent the capacitor section 3 is the inductor section 4. The section 4 has a metallic, circular cylindrical outer casing 32 that shields the interior and which constitutes part of the enclosing wall of the cavity 1. A female connector ring 33 is tightly fitted within the left-hand end of the casing 32, and it presents a sealing face 34 that faces axially toward and is of the same diameter as the sealing face 29 of the capacitor section 3. The radially inner edge of the sealing face 34 forms a small ledge 35, and seated behind the ledge 35 is a ring of closely spaced, resilient, metallic fingers 36. The resilient fingers 36 are formed from a metal strip, they are interconnected to one another, and such strip is bent into a circle for insertion behind the ledge 35. The fingers 36 together with the connector ring 33 form an outer female socket for tight receipt of the rim 28 of the male connector ring 27.

Mounted within the ring 33 is a flat, circular insulator 37 that supports a female inner hub 38. The inner hub 38 is held concentric with respect to the outer casing 32, and to hold the parts 37 and 38 in position a number of split retaining rings 39 are employed. The hub 38 is cup shaped, and has a lip 40 behind which is seated a ring of resilient fingers 41, such fingers 41 and the lip 40 form an inner female socket adapted to receive and tightly grasp the male hub 30 of the capacitor section 3.

At the right-hand end of the outer casing 32 a male connector ring 42 presenting a sealing face 43 which is immediately adjacent an outer rim 44. A supporting insulator 45 is mounted in the ring 42 to support a male inner hub 46 that is concentric with the outer casing 32. The hub 46 is generally cup shaped and presents an inner rim 47 that lies in a common transverse plane with the outer rim 44. To complete the inductor section 4, there is a coil 48 connected to and spanning between the hubs 38 and 46. This coil 48 presents a high Q inductive reactance and simulates a power source impedance.

Turning now to the test section 5, there is an outer casing 49 of relatively short axial length. In the casing 49 there are snugly fitted female connector ring 50 and male connector ring 51, which in cross section are of like geometry as the rings 33 and 42 of the inductor section 4. Supporting insulators 52 and 53 mount a female inner hub 54 and a male inner hub 55. The hub 54 presents an inner female socket like the inner socket of the section 4, and the hub 55 presents a male connection like the hub 46 of section 4. The hubs 54, 55 are of an axial depth such that they abut one another, and the interfaces are soldered to one another to develop a unitary central member that presents negligible resistance and inductance to the circuit.

A test wire 59 is soldered at its lower end to the hub 55 in a direct metal to metal contact, and extends radially outward through the casing 49 to a standard coaxial connector 60. The exterior of the connector 60 joins electrically with the casing 49 through the medium of a short, upstanding tube 61.

The filter section 6 constitutes a chamber defined by an outer casing 62. A filter 63, that is under test, is mounted within the chamber by a cup 64 that is tightly fitted within the left-hand end of the casing 62. The filter 63 is inserted through and bolted to the central web 65 of the cup 64, and the web 65 constitutes an electrical connection between the filter 63 and the casing 62, so that one side of the filter is grounded in the same manner as in actual use. The cup 64 also functions to provide a sealing face 66 and to seat a ring of resilient fingers 67 to present an outer female socket similarly as the sockets for the prior described sections 4, The filter 63 has a feed-through lead which presents threaded terminals 68 at its opposite ends, and tightly secured to the left-hand terminal 68 is a female inner hub 69. Mounted on the opposite end of the filter 63 is a male inner hub 70, and by virtue of the rigid connection of the filter 63 to the web 65 the hubs 69, 70 are firmly held in position. To complete the section 6, a male connector ring 71 presenting a rim 72 is seated in the right-hand end of the casing 62. The ring 71 is brazed to the casing 62, and similarly the prior described rings 33, 42, 50, 51 and cup 64 are permanently fixed in place by brazing.

The second test section 7 is like test section 5, and its female sockets are connectable with the male portions at the right-hand end of the filter section 6. Next, there is shown in FIG. 2 the second inductor section 8, and for purposes of illustration this section 8 differs from the first inductor section 4. The overall length is reduced, and the inductor element 73 constitutes a short rod held in place by a pair of bolts. This illustrates that to achieve different values of inductive reactance the inductor elements take different configurations. A short rod, as in section 8, presents a small reactance, while inductors of multiple turns present increased reactance.

A further distinction between the inductor sections 4 and 8, is that the section 8 has female connectors at each end. This is a matter of design choice, and if preferred the last section 9 may have female connectors, in which case the inductor section 8 will have male connectors at its right-hand end like those of section 4. As illustrated in FIG. 2, however, the capacitor section 9 is the same as the first capacitor section 3, which necessitates the female connections at both ends of the section 8.

A method of use of the apparatus will now be discussed. The prime purpose of the circuit is to develop a characteristic curve over a predetermined range of frequencies depicting the insertion loss of a filter under the worst-case condition for each frequency. As noted hereinbefore, the worst-case condition exists when the reactance of a circuit to which the filter is connected is equal to and opposite in value to the reactive component of the filter. This is a resonant condition at the interface, or junction between the filter and the circuit, and if a high Q is incorporated in the circuits the worst-case condition is more pronounced. For the purpose of obtaining an adequate test the Q of the inductors should preferably be 15 or better at and near the frequency of the worst-case condition, and other portions of the test circuit should not insert any appreciable dampening resistance.

A worst-case condition can exist at either end of the filter. The worst-case with a power source impedance is usually independent of the worst-case with a load impedance, for the reason that at the high frequencies of electromagnetic induction the impedance of the filter is usually much higher than for either the power source or load. The worst-cases at the two ends of the filter are, however, cumulative and therefore for the purpose of obtaining the total worst-case situation testing contemplates an impedance mismatch at both filter ends. If desired, of course, the test herein may be conducted with a mismatch on one side alone.

Like inductors are selected for sections 4 and 8, and are assembled with the other sections 3, 5, 6, 7 and 9. Assembly merely comprises the joining of each male connector with a female connector of the adjacent section, and in making such plug-in connections the sealing faces, such as 29 and 34, are brought up tight with one another to insure that the cavity 1 is an electrically tight enclosure. The connections also have negligible impedance and are of adequate size to carry the requisite low frequency circuit. These objectives are achieved by the hub elements being of large diameter to reduce inductance and to provide current carrying capacity. The size of the hubs is substantially larger than the diameter of the inductors of high Q value.

The filter 63 is usually a symmetrical device, presenting a like impedance from either of its end terminals 68, and consequently identical inductors in the sections 4 and 6 will produce a like impedance mismatch on both sides of the filter 63 and the worst-case condition will occur on each side at the same frequency.

With the circuit assembled, the transformer 12 and load 15 are regulated to produce a rated load current of the filter, such as for example 50 amperes. The generator 16 is then operated through a range of frequencies with the output current, as measured by probe 19, being maintained constant. For the frequency at which the detector 23 measures a maximum voltage the filter is performing most poorly, and a worst-case condition exists. At this frequency setting the input current to the test section 5 is measured by the current probe 19 and recorded. Next, the filter section 6 is removed from the cavity 1. The generator 16 is now maintained at the same frequency and its output is adjusted to have the same reading of voltage at the detector 23 as for the worst-case condition with the filter in the circuit. A reading of the high frequency input current is again taken with the current probe 19, and the ratio of the two input current readings, i.e., the current with the filter in the circuit divided by the current with the filter out of the circuit, is an indication of insertion loss. To convert such loss into decibels the following relation is used:

$$IL = 20 \log I_1/I_2$$

wherein $I_1$ is the current reading for the high frequency input when the filter is in the circuit and the frequency is adjusted to obtain a maximum voltage across the load impedance of the inductor section 8, and $I_2$ is the current reading for the high frequency input when the filter is removed from the circuit and the frequency and voltage is maintained the same as when reading $I_1$.

Next, a second set of inductors is selected and inserted in the circuit. These will give a worst-case condition at a different frequency, and the test procedure is repeated, to determine a worst-case insertion loss for a second frequency. This procedure is repeated with the use of different sets of inductor sections, and the values of IL for the different frequencies are plotted to obtain a characteristic curve. The accuracy of the procedure is dependent upon the current reading $I_2$, which is the reading of input current with the filter removed, having little variation with frequency change in the region of worst-case condition. This usually holds, so that the method herein gives good results. If it does not hold for a particular apparatus, then for each set of inductors a complete insertion loss curve should be plotted in the region of the worst-case condition, and the worst-case points of the individual curves must then be connected to obtain the envelope curve representing worst-case conditions.

The invention provides a test apparatus and a method of test for power line filters that gives a plot of insertion loss for worst-case conditions in an efficient manner. The interconnectable sections facilitate rapid interchange of parts, and the use of fixed inductors eliminates difficulties of using variable devices which may not have adequately high Q factors. The invention further teaches the use of a high frequency current source in parallel with the simulated power source impedance and the use of test leads, in the test sections, that are in direct contact with the power source-filter circuit.

We claim:

1. In an apparatus for testing electrical filters the combination comprising
a test cavity made up of a plurality of plug-in connected sections, each section having an outer casing with connector elements at each end and further having inner hubs spaced radially inward of the casing that are located at the ends of the casing;
one of said sections comprising a chamber for mounting a filter to be tested, a second of said sections enclosing a test impedance between the inner hubs of the section that simulates a power source reactance, and a third of the sections mounting a test lead connected with the hubs thereof.

2. In an apparatus for testing electrical filters the combination comprising:
a test cavity made up of a plurality of plug-in connected sections, each section having an outer casing with connector elements at each end and further having inner connector hubs spaced radially inward of the casing that are located at the ends of the casing;

the plug-in connection between a pair of sections providing an electrical junction of negligible impedance between an inner hub of one section and an inner hub of the other section, and further providing a continuation of the casing of one section with the casing of the other to maintain a shielded enclosure;

one of said sections comprising a mounting for a filter to be tested, a second of said sections mounting a test impedance between the inner hubs of the section, and a third of the sections mounting a test lead connected with the hubs of the section.

3. An apparatus as in claim 2 in which the test lead is connected in a common electrical junction with the filter and the test impedance.

4. An apparatus as in claim 2 having a feed-in capacitor section for connection to the section mounting the test impedance for introducing a low frequency load current to the apparatus.

5. An apparatus as in claim 2 wherein said test impedance has a Q of at least 15 for the frequency of worst-case condition.

6. A section for a test apparatus that is connectable with additional sections, such section comprising:
an outer tubular casing;
a female connector ring fitted in one end of said casing having an axial facing sealing face and a socket portion adjacent such sealing face;
a male connector ring fitted in the other end of said casing having an axial facing sealing face and a ring portion adjacent such sealing face for receipt by a socket portion of a female connector ring;
a radially extending supporting insulator mounted in each end of said casing;
a female inner hub supported by one of said insulators that is spaced radially inward from said casing, which hub has a socket portion and is of such radial extent as to present negligible impedance;
a male inner hub supported by the other of said insulators that is spaced radially inward from said casing, which hub has a rim portion for receipt by a socket portion of a female inner hub and is of such radial extent as to present negligible impedance; and
circuit means between said inner hubs.

7. A device as in claim 6 wherein the circuit means is an inductor having a Q of at least 15 at the frequency of worst-case condition.

8. A device as in claim 6 wherein the circuit means is a filter to be tested.

9. A device as in claim 6 wherein the circuit means is a lead in direct contact with the hubs.

10. A circuit for testing insertion loss of electrical filters comprising:
a first impedance element representative of a power source impedance;
a high frequency current source in an electrical parallel connection with said impedance element that comprises a direct metal to metal contact;
a second impedance element representative of a load impedance;
connections for inserting and removing a filter from between said second impedance element and the parallel connection of said first impedance element and said current source, said connections also joining the filter in parallel with both said first and second impedances; and
test connections for reading electrical values in the circuit that are in electrical parallel relation with said second impedance.

11. A circuit as in claim 10, wherein said test connections are between the second impedance element and connections for a filter, to thereby read voltage of the second impedance.

12. A circuit as in claim 10 having a pair of lead-in capacitors, one connected to the first impedance and the other connected to the second impedance, said capacitors having feed-through lines for introducing a low frequency load current to a filter under test, and the capacitive elements providing a bypass for the high frequency.

13. A circuit as in claim 12 wherein the impedance elements and filter are within a closed cavity and said lead-in capacitors are at the ends of the cavity.

14. In a test circuit for electrical filters the combination of:
an enclosed cavity comprising a filter section having an outer shield and a mounting therein for a filter to be tested, a first inductor section having an outer shield and an inductor therein that is connectable with said filter and that simulates a power source impedance, a first test section having an outer casing and a feed-in lead connectable by direct metallic connection with the common connection of said filter and inductor to place the feed-in lead, inductor and a filter to be tested in electrical parallel relation with one another, a second inductor section having an outer casing and a second inductor therein that is connectable to said filter and that simulates a load impedance, and a second test section having an outer shield and a feed-in lead connectable by direct metallic connection with said second inductor to place the feed-in lead, second inductor and a filter to be tested in electrical parallel relation with one another;
a high frequency generator joined to tee feed-in lead of said first test section to supply an electromagnetic interference simulating current; and
a detector connected to the feed-in lead of said second test section to read load voltage; and
the outer shields of the aforesaid sections joining one another to form said cavity.

15. A circuit as in claim 14 wherein said inductor has a Q of at least 15 at the frequency of worst-case condition.

16. A test circuit as in claim 14 having a feed-in capacitor connected to each inductor section, each feed-in capacitor having a shielded exterior that forms a part of the cavity and a feed-through line for introducing low frequency load current to a filter under test, the plates of each capacitor forming a bypass for high frequency test signals.

17. In an apparatus for testing electrical filters, the combination comprising:
a feed-in capacitor section having a shielded exterior and a feed-through line with a capacitive element between such line and exterior, said capacitor section having a connector ring encircling a terminus of said feed-through line that presents a sealing face for abutment with a subsequent section of the apparatus, and further having a connection hub mounted within said connector ring that is secured to said feed-through line;
an inductor section having an outer casing, a ring member at each end of said casing that presents a sealing face for abutment with a similar face of an adjacent section, a radially inward extending supporting insulator mounted within each end of said casing, an inner hub supported by each insulator which is substantially concentric with said casing, and an inductor connected between said inner hubs of a cross section dimension only a minor fraction of the cross section of said hubs;
said inductor section and said capacitor section having a plug-in connection with one another, wherein the ring and inner hub at one end of said inductor section form an electrical junction with the connector ring and connection hub of said capacitor section, parts of one ring being a male member received by a female member in the other ring, and parts of one hub being a male member received by a female member in the other hub, and the sealing faces of the joining rings abutting against one another, the resulting electrical junction providing a negligible impedance connection between hubs and a continuous cavity between sections;
a test section having an outer casing, a ring member at each end of said casing that presents a sealing face for abutment with a similar face of an adjacent section, a pair of radially inward extending supporting insulators mounted within said casing, an inner hub supported by each insulator which is substantially concentric with said casing, said hubs being joined as a continuation of one another, and a test lead extending from said hubs radially outward through said outer casing;

said inductor section and said probe section having a plug-in connection with one another, wherein the ring and inner hub at one end of said test section form an electrical junction with a ring and inner hub at an end of said inductor section, parts of one ring being a male member received by a female member in the other ring, and parts of one hub being a male member received by a female member in the other hub, and the sealing faces of the joining rings abutting against one another, the resulting electrical junction providing a negligible impedance connection between hubs and a continuous cavity between sections;

a filter section having an outer casing, a ring member at each end of said casing that presents a sealing face for abutment with a similar face of an adjacent section, a mounting web in the casing in which a filter to be tested is mounted, and a inner hub supportable at each end of the filter which is substantially concentric with said casing;

said filter section and said test section having a plug-in connection with one another, wherein the ring and inner hub at one end of said filter section form an electrical junction with the connector ring and connection hub of said test section, parts of one ring being a male member received by a female member in the other ring, and parts of one hub being a male member received by a female member in the other hub, and the sealing faces of the joining rings abutting against one another, the resulting electrical junction providing a negligible impedance connection between hubs and a continuous cavity between sections; and second test, inductor and feed-in capacitor sections similar to the aforesaid test, inductor and feed-in capacitor sections connected to one another on the opposite end of the filter section.

18. In an apparatus for testing electrical filters, the combination comprising:

a feed-in capacitor section having a shielded exterior and a feed-through line with a capacitive element between such line and exterior, said capacitor section having a connector ring encircling said feed-through line and a connection hub secured to said feed-through line;

an inductor section having an outer casing, a ring member at each end of said casing, a supporting insulator mounted within each end of said casing, an inner hub supported by each insulator, and an inductor connected between said inner hubs;

said inductor section and said capacitor section having a plug-in connection with one another, wherein the ring and inner hub at one end of said inductor section form an electrical junction with the connector ring and connection hub of said capacitor section, parts of one ring being a male member received by a female member in the other ring, and parts of one hub being a male member received by a female member in the other hub;

a test section having an outer casing, a ring member at each end of said casing, a pair of supporting insulators mounted within said casing, an inner hub supported by each insulator, said hubs being joined as a continuation of one another, and a test lead extending from said hubs radially outward through said outer casing;

said inductor section and said test section having a plug-in connection with one another, wherein the ring and inner hub at one end of said test section form an electrical junction with a ring and inner hub at an end of said inductor section, parts of one ring being a male member received by a female member in the other ring, and parts of one hub being a male member received by a female member in the other hub;

a filter section having an outer casing, a ring member at each end of said casing, a mounting web in the casing in which a filter to be tested is mounted, and an inner hub supportable at each end of the filter;

said filter section and said test section having a plug-in connection with one another, wherein the ring and inner hub at one end of said filter section form an electrical junction with the connector ring and connection hub of said test section, parts of one ring being a male member received by a female member in the other ring, and parts of one hub being a male member received by a female member in the other hub, and second test, inductor and feed-in capacitor sections similar to the aforesaid test, inductor and feed-in capacitor sections connected to one another on the opposite end of the filter section.

19. In an apparatus for testing electrical filters, the combination comprising:

an inductor section having an outer casing, a ring member at each end of said casing, an inner hub supported in each end of and spaced from said casing, and an inductor connected between said inner hubs of a cross section only a minor fraction of the cross section of said hubs;

a test section having an outer casing, a ring member at each end of said casing, an inner hub supported in each end of and spaced from said casing, said hubs being joined as a continuation of one another, and a test lead extending from said hubs radially outward through said outer casing;

said inductor section and said test section having a plug-in connection with one another, wherein the ring and inner hub at one end of said test section form an electrical junction with a ring and inner hub at an end of said inductor section, parts of one ring being a male member received by a female member in the other ring, and parts of one hub being a male member received by a female member in the other hub;

a filter section having an outer casing, a ring member at each end of said casing, a mounting web in the casing in which a filter to be tested is mounted, and an inner hub supportable at each end of the filter; and said filter section and said test section having a plug-in connection with one another, wherein the ring and inner hub at one end of said filter section form an electrical junction with the connector ring and connection hub of said test section, parts of one ring being a male member received by a female member in the other ring, and parts of one hub being a male member received by a female member in the other hub.

20. A method of testing a filter comprising:

attaching a high frequency power source and an inductor in parallel and attaching the parallel connection to a filter to be tested;

attaching a second inductor to the opposite side of the filter;

maintaining power source current at a fixed level and varying the frequency of the output of the power source to select that frequency at which a maximum voltage is detected for the second inductor;

removing the filter from the circuit;

maintaining the selected frequency and the maximum voltage across the second inductor;

reading the power source current;

and taking a comparison of the power source current reading which was maintained when the filter was in the circuit with the current reading with the filter out of the circuit to thereby obtain an indication of the insertion loss of the filter for the selected frequency.

21. A method of testing a filter comprising:

joining the filter between two inductors simulating a power source reactance and a load reactance;

feeding a high frequency current to the filter and power source reactance;

selecting a current level for the high frequency, $I_1$, and varying the frequency to obtain a maximum voltage for the load reactance;

removing the filter from the circuit;

for the same maximum voltage and the same frequency at which such maximum voltage was obtained measuring the high frequency current, $I_2$, comparing $I_1$ with $I_2$ as an indication of filter insertion loss for the said frequency.

22. A method as in claim 21, in which the comparison of $I_1$ and $I_2$ is made by the following relationship:

$$IL = 20 \log I_1/I_2$$

and repeating the procedure several times with different reactance values to obtain a characteristic curve over a range of frequencies.

* * * * *

PO-1050
(5/69)

UNITED STATES PATENT OFFICE
CERTIFICATE OF CORRECTION

Patent No. 3,651,400          Dated March 21, 1972

Inventor(s) William J. McMartin and Hans E. Weidmann

It is certified that error appears in the above-identified patent and that said Letters Patent are hereby corrected as shown below:

Column 2, line 3, "or" should read ---of---
Column 4, line 6, "tat" should read ---that---
Column 4, line 34, after "32" insert ---is---
Column 4, line 73, after "4," insert ---5.---
Column 8, line 25, "tee" should read ---the---

Column 9, line 22, "a" should read ---an---
Column 11, line 1, delete second appearance of "$_1$"

Signed and sealed this 18th day of July 1972.

(SEAL)
Attest:

EDWARD M. FLETCHER, JR.          ROBERT GOTTSCHALK
Attesting Officer          Commissioner of Patents

UNITED STATES PATENT OFFICE
CERTIFICATE OF CORRECTION

Patent No.  3,651,400           Dated March 21, 1972

Inventor(s)    William J. McMartin et al.

It is certified that error appears in the above-identified patent and that said Letters Patent are hereby corrected as shown below:

Column 8, line 32, after "inductor" insert -- of said first inductor section --.

Signed and sealed this 12th day of September 1972.

(SEAL)
Attest:

EDWARD M. FLETCHER, JR.            ROBERT GOTTSCHALK
Attesting Officer                  Commissioner of Patents